United States Patent
Loukili et al.

(10) Patent No.: US 11,690,368 B2
(45) Date of Patent: *Jul. 4, 2023

(54) AGRICULTURAL PLANT DETECTION AND CONTROL SYSTEM

(71) Applicants: Deere & Company, Moline, IL (US); Iowa State University Research Foundation, Inc., Ames, IA (US)

(72) Inventors: Tarik Loukili, Johnston, IA (US); Timothy A. Bigelow, Ames, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,794

(22) Filed: Jan. 13, 2022

(65) Prior Publication Data

US 2022/0217967 A1 Jul. 14, 2022

Related U.S. Application Data

(63) Continuation of application No. 16/670,612, filed on Oct. 31, 2019, now Pat. No. 11,259,515.

(51) Int. Cl.
*G06T 7/00* (2017.01)
*A01M 21/00* (2006.01)
(Continued)

(52) U.S. Cl.
CPC .......... *A01M 21/00* (2013.01); *A01M 7/0089* (2013.01); *G06F 18/214* (2023.01);
(Continued)

(58) Field of Classification Search
CPC .. A01M 21/00; A01M 7/0089; G06K 9/6224; G06K 9/6256; G06T 2207/20081; G06T 2207/30188; G06T 7/0012; G06T 7/11
See application file for complete search history.

(56) References Cited

U.S. PATENT DOCUMENTS 5,585,626 A * 12/1996 Beck .................. G01J 1/44
250/559.38
5,924,239 A 7/1999 Rees et al.
(Continued)

FOREIGN PATENT DOCUMENTS

CN 1628513 A 6/2005
CN 102599138 A 7/2012
(Continued)

OTHER PUBLICATIONS

Hong, S., Minzan, L. and Qin, Z., 2012. Detection system of smart sprayers: Status, challenges, and perspectives. International Journal of Agricultural and Biological Engineering, 5(3), 15 pages.
(Continued)

*Primary Examiner* — Bobbak Safaipour
(74) *Attorney, Agent, or Firm* — Christopher J. Volkmann; Kelly, Holt & Christenson, PLLC

(57) ABSTRACT

A computing system includes image receiving logic configured to receive image data indicative of an image of a field, ground identification logic configured to identify a first image portion of the image representing ground in the field, image segmentation logic configured to identify a remaining image portion that omits the first image portion from the image, and crop classification logic configured to apply a crop classifier to the remaining image portion and identify a second image portion of the image that represents locations of crop plants in the field. The computing system also includes weed identification logic configured to identify locations of weed plants in the field based on the identification of the first and second image portions and control signal generation logic configured to generate a machine control signal based on the identified locations of the weed plants.

20 Claims, 11 Drawing Sheets

(51) Int. Cl.
  *G06T 7/11* (2017.01)
  *A01M 7/00* (2006.01)
  *G06F 18/214* (2023.01)
  *G06F 18/2323* (2023.01)

(52) U.S. Cl.
  CPC ........ *G06F 18/2323* (2023.01); *G06T 7/0012* (2013.01); *G06T 7/11* (2017.01); *G06T 2207/20081* (2013.01); *G06T 2207/30188* (2013.01)

(56) References Cited

U.S. PATENT DOCUMENTS

| | | | |
|---|---|---|---|
| 6,070,539 | A | 6/2000 | Flamme et al. |
| 8,488,874 | B2 | 7/2013 | Zaman et al. |
| 8,558,157 | B2 | 10/2013 | Holland |
| 2010/0032492 | A1 | 2/2010 | Grimm et al. |
| 2011/0147479 | A1 | 6/2011 | Overskeid et al. |
| 2012/0195496 | A1 | 8/2012 | Zaman et al. |
| 2013/0266183 | A1* | 10/2013 | Boncyk ................ G06F 3/0482 382/103 |
| 2014/0263709 | A1 | 9/2014 | Kocer et al. |
| 2015/0305226 | A1 | 10/2015 | Zemenchik |
| 2016/0044862 | A1 | 2/2016 | Kocer |
| 2017/0084039 | A1* | 3/2017 | Ritter ................... G06V 20/188 |
| 2019/0104722 | A1 | 4/2019 | Slaughter et al. |
| 2020/0230633 | A1* | 7/2020 | Serrat ................... H04N 23/54 |
| 2020/0279374 | A1* | 9/2020 | King ................ G06F 18/23213 |
| 2021/0056338 | A1* | 2/2021 | Padwick ................ G06V 20/38 |
| 2021/0127659 | A1* | 5/2021 | Loukili ..................... G06T 7/11 |
| 2021/0264624 | A1* | 8/2021 | Fu ......................... A01C 23/007 |
| 2021/0364487 | A1* | 11/2021 | Zhang ...................... G01J 5/00 |
| 2022/0317294 | A1* | 10/2022 | Veronesi ............. G01S 7/52053 |

FOREIGN PATENT DOCUMENTS

| | | |
|---|---|---|
| CN | 103464326 A | 12/2013 |
| DE | 4016603 A1 | 11/1991 |
| RU | 2129785 C1 | 5/1999 |
| WO | WO 2012122988 A1 | 9/2012 |
| WO | WO 2014001416 A1 | 1/2014 |

OTHER PUBLICATIONS

Extended European Search Report for European Patent Application No. 20200798.5 dated Mar. 12, 2021, 8 pages.
Prosecution History for U.S. Appl. No. 16/670,612 including:Response to 312 Amendment dated Nov. 10, 2021,Response to Notice to File Corrected Application Papers dated Nov. 3, 2021,Notice to File Corrected Application Papers dated Oct. 29, 2021,Notice of Allowance dated Oct. 15, 2021, Interview Summary dated Sep. 13, 2021,Amendment dated Sep. 9, 2021,Examiner Interview Summary dated Sep. 7, 2021,Non-Final Office Action dated Jun. 9, 2021,Application and Drawings filed Oct. 31, 2019, 134 pages.
Office Action for Eueropean Patent Application No. 20200798.5, dated May 2, 2023, 65 pages.

* cited by examiner

AGRICULTURAL PLANT DETECTION AND CONTROL SYSTEM

CROSS-REFERENCE TO RELATED APPLICATION

The present application is a continuation of and claims priority of U.S. patent application Ser. No. 16/670,612, filed Oct. 31, 2019, the content of which is hereby incorporated by reference in its entirety.

FIELD OF THE DESCRIPTION

The present description generally relates to agricultural machines. More specifically, but not by limitation, the present description relates to plant evaluation and machine control using field images.

BACKGROUND

There are many different types of agricultural machines. One such machine is an agricultural sprayer. An agricultural spraying system often includes a tank or reservoir that holds a substance to be sprayed on an agricultural field. Such systems typically include a fluid line or conduit mounted on a foldable, hinged, or retractable and extendible boom. The fluid line is coupled to one or more spray nozzles mounted along the boom. Each spray nozzle is configured to receive the fluid and direct atomized fluid to a crop or field during application. As the sprayer travels through the field, the boom is moved to a deployed position and the substance is pumped from the tank or reservoir, through the nozzles, so that it is sprayed or applied to the field over which the sprayer is traveling.

The discussion above is merely provided for general background information and is not intended to be used as an aid in determining the scope of the claimed subject matter.

SUMMARY

A computing system includes image receiving logic configured to receive image data indicative of an image of a field, ground identification logic configured to identify a first image portion of the image representing ground in the field, image segmentation logic configured to identify a remaining image portion that omits the first image portion from the image, and crop classification logic configured to apply a crop classifier to the remaining image portion and identify a second image portion of the image that represents locations of crop plants in the field. The computing system also includes weed identification logic configured to identify locations of weed plants in the field based on the identification of the first and second image portions and control signal generation logic configured to generate a machine control signal based on the identified locations of the weed plants.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
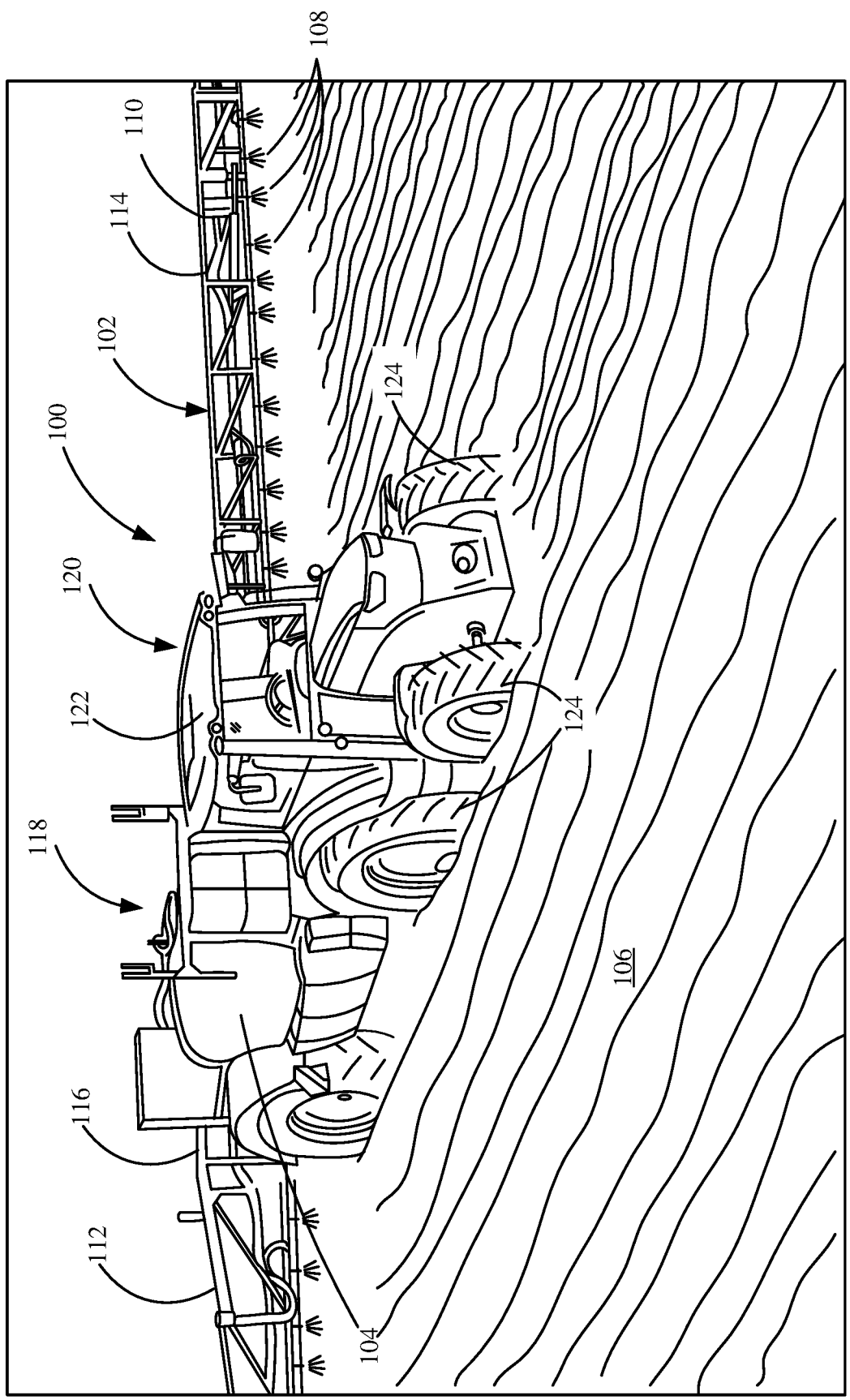
FIG. 1 illustrates an example agricultural sprayer.

The present description generally relates to agricultural machines. More specifically, but not by limitation, the present description relates to plant evaluation and machine control using field images.

As an agricultural spraying machine (or agricultural sprayer) traverses a field, it applies a spray of a liquid (e.g., herbicide, fertilizer, fungicide, or other chemical) using nozzles mounted on a boom. A spraying system, which typically includes a pump that pumps the liquid from a reservoir to the nozzles mounted on the boom, is controlled to deliver a target or prescribed application to the agricultural field. For example, in precision spraying applications, the sprayer is controlled to deliver the liquid to a precise dispersal area, such as directly on a plant (crop or weed), in between plants, or otherwise, at a particular rate so that a target quantity of the liquid is applied to the dispersal area. Accordingly, precise application of the liquid is important in these applications. For example, if an herbicide is unevenly applied or applied to incorrect plants, it is wasted in areas of over-application, and areas of under-application experience reduced weed prevention.

For sake of illustration, image processing is performed in some precision spraying applications by acquiring images of the field to identify the locations of the weeds to be sprayed with an herbicide (or other liquid chemical). In some approaches, a weed classifier is trained with training data to detect the various types of weeds to be sprayed. However, due to a wide range of possible field scenarios, such as a plurality of different possible weed types, different weed conditions, different lighting, etc., a large collection of images are required to train the weed classifier. The computing resources and processing required to both acquire and process these images, and to train the classifier, can be quite burdensome and computational expensive. Even still, the trained weed classifier may perform poorly during varying runtime field applications when trying to classify in different lighting conditions and/or when the weeds are damaged by insects, weather, etc. The inaccurate weed identification results in poor spraying performance.

For sake of the present discussion, a "weed" or "weed plant" refers to any non-crop plant identified in the field. That is, it includes plant types other than crop plants (e.g., corn plants in a corn field) expected to be present in the field under consideration. In the corn field example, weeds or weed plants include any plants other than corn plants.

The present disclosure provides a plant evaluation and control system that acquires images of a field and processes those images to identify portion(s) of the image that represent ground (i.e., the soil or other non-plant areas of the field terrain), and omits those identified portions from the image to identify a remaining image portion. This remaining image portion is processed by applying a crop classifier to detect, from the plants in the remaining image portion, areas of the image that represent crop. Locations of weed plants represented in the image are identified based on the identification of the portions of the image that represent ground and the portions of the image that represent crop, e.g., by omitting the ground and crop portions from the image, and then correlating the remaining weed plant image portion to the geographic field locations. This weed location information can be utilized in any of a number of ways, for example by controlling an agricultural sprayer, generating a weed plant map for the field, to name a few.

FIG. 1 illustrates an agricultural spraying machine (or agricultural sprayer) 100. Sprayer 100 includes a spraying system 102 having a tank 104 containing a liquid that is to be applied to field 106. Tank 104 is fluidically coupled to spray nozzles 108 by a delivery system comprising a set of conduits. A fluid pump is configured to pump the liquid from tank 104 through the conduits through nozzles 108. Spray nozzles 108 are coupled to, and spaced apart along, boom 110. Boom 110 includes arms 112 and 114 which can articulate or pivot relative to a center frame 116. Thus, arms 112 and 114 are movable between a storage or transport position and an extended or deployed position (shown in FIG. 1).

In the example illustrated in FIG. 1, sprayer 100 comprises a towed implement 118 that carries the spraying system, and is towed by a towing or support machine 120 (illustratively a tractor) having an operator compartment or cab 122. Sprayer 100 includes a set of traction elements, such as wheels 124. The traction elements can also be tracks, or other traction elements as well. It is noted that in other examples, sprayer 100 is self-propelled. That is, rather than being towed by a towing machine, the machine that carries the spraying system also includes propulsion and steering systems.

Figure 2:
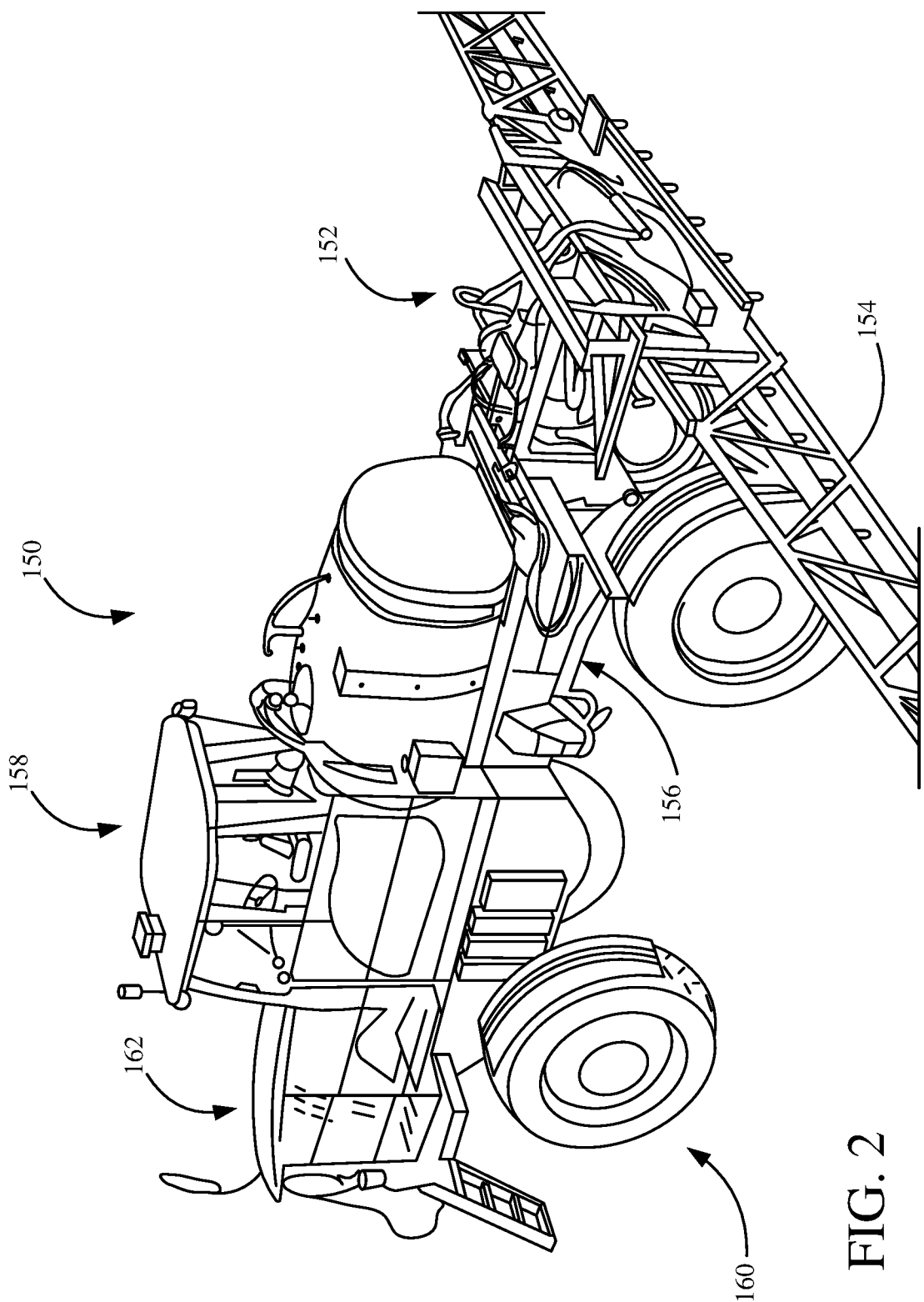
FIG. 2 illustrates an example agricultural sprayer.

FIG. 2 illustrates one example of an agricultural sprayer 150 that is self-propelled. That is, sprayer 150 has an on-board spraying system 152, that is carried on a machine frame 156 having an operator compartment 158, a steering system 160 (e.g., wheels or other traction elements), and a propulsion system 162 (e.g., internal combustion engine).

Figure 3:
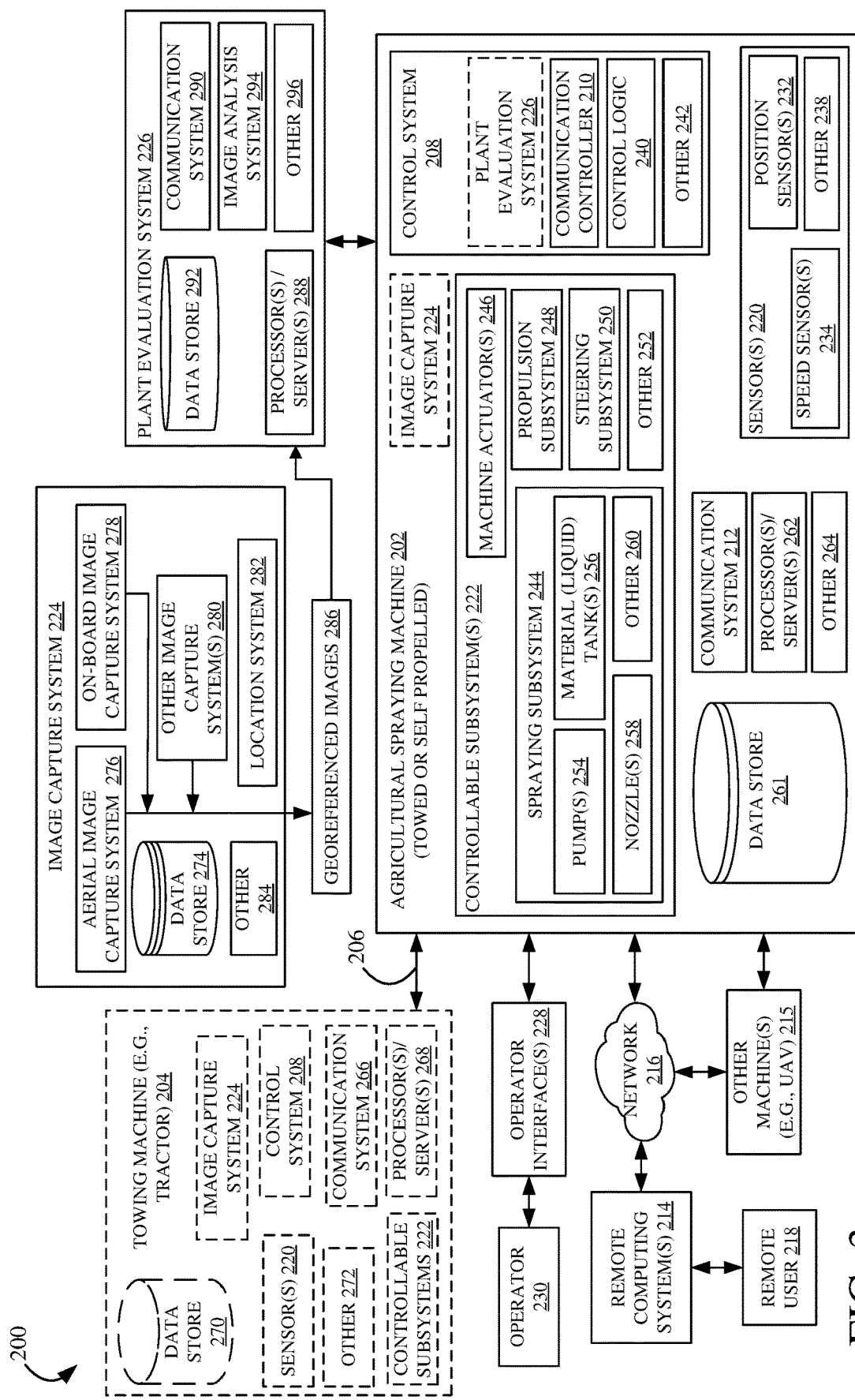
FIG. 3 is a block diagram of one example of an agricultural spraying machine architecture.

FIG. 3 illustrates one example of an architecture 200 having an agricultural spraying machine 202 configured to perform a spraying operation on an agricultural field. Examples of agricultural spraying machine 202 include, but are not limited to, sprayers 100 and 150 illustrated in FIGS. 1 and 2. Accordingly, machine 202 can comprise a towed implement or it can be self-propelled. FIG. 3 illustrates this with dashed box 204 representing a towing machine, such as a tractor that is coupled to machine 202 through one or more links 206 (electrical, mechanical, pneumatic, etc.).

Machine 202 includes a control system 208 configured to control other components and systems of machine 202. For instance, control system 208 includes a communication controller 210 configured to control communication system 212 to communicate between components of machine 202 and/or with other machines or systems, such as remote computing system 214 and/or machine(s) 215, either directly or over a network 216. Network 216 can be any of a wide variety of different types of networks such as the Internet, a cellular network, a local area network, a near field communication network, or any of a wide variety of other networks or combinations of networks or communication systems.

A remote user 218 is illustrated interacting with remote computing system 214. Remote computing system 214 can be a wide variety of different types of systems. For example, remote system 214 can be a remote server environment, remote computing system that is used by remote user 218. Further, it can be a remote computing system, such as a mobile device, remote network, or a wide variety of other remote systems. Remote system 214 can include one or more processors or servers, a data store, and it can include other items as well.

Communication system 212 can include wired and/or wireless communication logic, which can be substantially any communication system that can be used by the systems and components of machine 202 to communicate information to other items, such as between control system 208, sensors 220, controllable subsystems 222, image capture system 224, and plant evaluation system 226. In one example, communication system 212 communicates over a controller area network (CAN) bus (or another network, such as an Ethernet network, etc.) to communicate information between those items. This information can include the various sensor signals and output signals generated by the sensor variables and/or sensed variables.

Control system 208 is configured to control interfaces, such as operator interface(s) 228 that include input mechanisms configured to receive input from an operator 230 and output mechanisms that render outputs to operator 230. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

Sensor(s) 220 can include any of a wide variety of different types of sensors. In the illustrated example, sensors 220 include position sensor(s) 232, speed sensor(s) 234, and can include other types of sensors 238 as well. Position sensor(s) 232 are configured to determine a geographic position of machine 202 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 234 are configure to determine a speed at which machine 202 is traveling the field during the spraying operation. This can include sensors that sense the movement of ground-engaging elements (e.g., wheels or tracks) and/or can utilize signals received from other sources, such as position sensor(s) 232.

Control system 208 includes control logic 240, and can include other items 242 as well. As illustrated by the dashed box in FIG. 3, control system 208 can include some or all of plant evaluation system 226, which is discussed in further detail below. Also, machine 202 can include some or all of image capture system 224. Control logic 240 is configured to generate control signals to control sensors 220, controllable subsystems 222, communication system 212, or any other items in architecture 200. Controllable subsystems 222 include a spraying subsystem 244, machine actuators 246, a propulsion subsystem 248, a steering subsystem 250, and can include other items 252 as well. Spraying subsystem 244 includes one or more pumps 254, configured to pump material (liquid chemicals) from tank(s) 256 through conduits to nozzles 258 mounted on a boom, for example. Spraying subsystem 244 can include other items 260 as well.

Machine 202 includes a data store 261 configured to store data for use by machine 202, such as field data. Examples include field location data that identifies a location of the field to be operated upon by a machine 202, field shape and topography data that defines a shape and topography of the field, crop location data that is indicative of a location of crops in the field (e.g., the location of crop rows), or any other data.

Machine 202 is illustrated as including one or more processors or servers 262, and can include other items 264 as well. As also illustrated in FIG. 3, where a towing machine 204 tows agricultural spraying machine 202, towing machine 204 can include some of the components discussed above with respect to machine 202. For instance, towing machine 204 can include some or all of sensors 220, component(s) of control system 208, some or all of controllable subsystems 222. Also, towing machine 204 can include a communication system 266 configured to communicate with communication system 212, one or more processors or servers 268, a data store 270, and it can include other items 272 as well. As also illustrated in FIG. 3, towing machine 204 can include some or all components of image capture system 224, which is discussed in further detail below.

Image capture system 224 includes image capture components configured to capture one or more images of the area under consideration (i.e., the portions of the field to be operated upon by spraying machine 202) and image processing components configured to process those images. The captured images represent a spectral response captured by image capture system 224 that are provided to plant evaluations system 226 and/or stored in data store 274. A spectral imaging system illustratively includes a camera that takes spectral images of the field under analysis. For instance, the camera can be a multispectral camera or a hyperspectral camera, or a wide variety of other devices for capturing spectral images. The camera can detect visible light, infrared radiation, or otherwise.

In one example, the image capture components include a stereo camera configured to capture a still image, a time series of images, and/or a video of the field. An example stereo camera captures high definition video at thirty frames per second (FPS) with one hundred and ten degree wide-angle field of view. Of course, this is for sake of example only.

Illustratively, a stereo camera includes two or more lenses with a separate image sensor for each lens. Stereo images (e.g., stereoscopic photos) captured by a stereo camera allow for computer stereo vision that extracts three-dimensional information from the digital images. In another example, a single lens camera can be utilized to acquire images (referred to as a "mono" image).

Image capture system 224 can include one or more of an aerial image capture system 276, an on-board image capture system 278, and/or other image capture system 280. An example of aerial image capture system 224 includes a camera or other imaging component carried on an unmanned aerial vehicle (UAV) or drone (e.g., block 215). An example of on-board image capture system 278 includes a camera or other imaging component mounted on, or otherwise carried by, machine 202 (or 204). An example of image capture system 280 includes a satellite imaging system. System 224 also includes a location system 282, and can include other items 284 as well. Location system 282 is configured to generate a signal indicative of geographic location associated with the captured image. For example, location system 282 can output GPS coordinates that are associated with the captured image to obtain geo-referenced images 286 that are provided to plant evaluation system 226.

Plant evaluation system 226 illustratively includes one or more processors 288, a communication system 290, a data store 292, an image analysis system 294, and can include other items 296 as well. Data store 292 can store the geo-referenced images 286 received from image capture system 224, plant evaluation data generated by system 226, or any other data used by system 226 or other machines or systems of architecture 200. Communication system 290, in one example, is substantially similar to communication system 212 discussed above.

Figure 4:
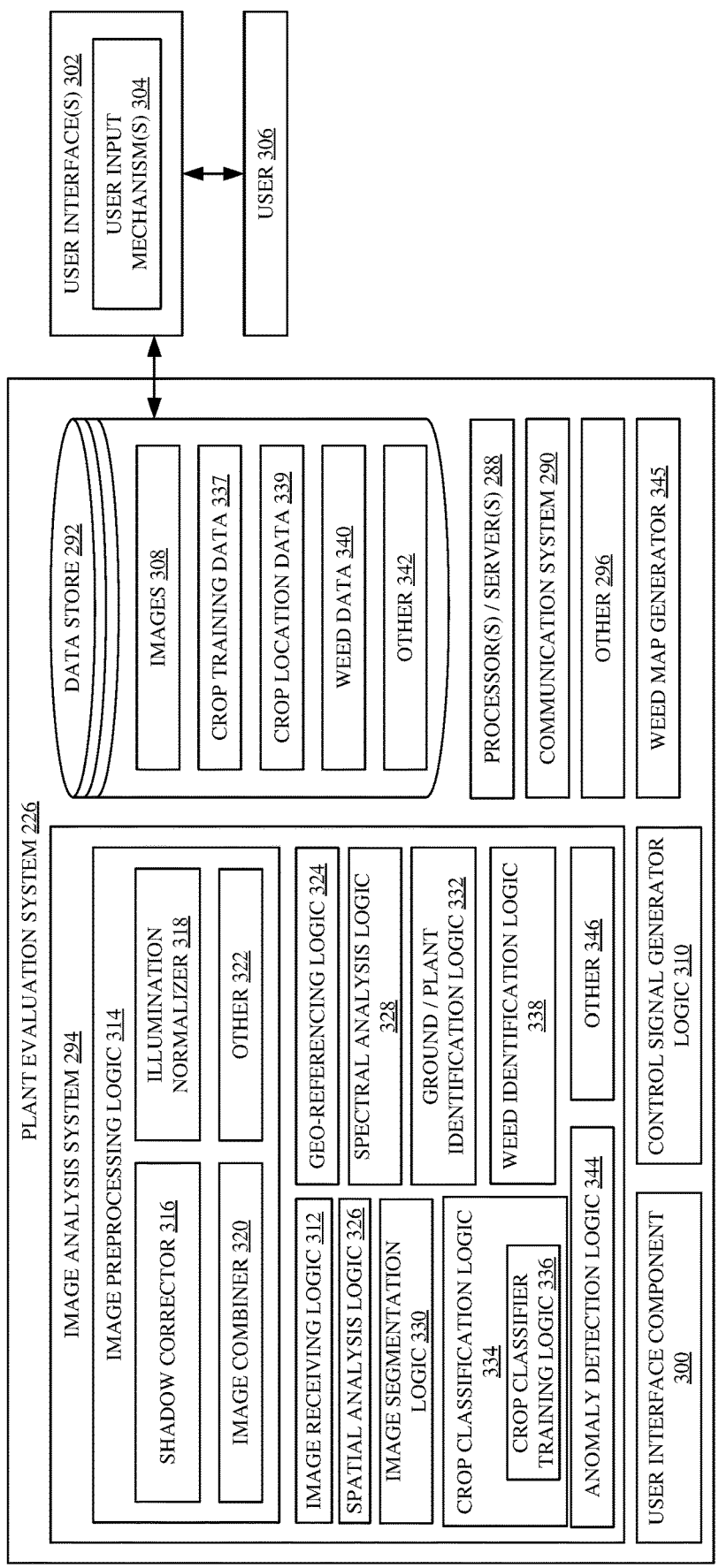
FIG. 4 illustrates one example of a plant evaluation system.

FIG. 4 illustrates one example of plant evaluation system 226. As shown in FIG. 4, system 226 includes a user interface component 300 configured to generate user interface(s) 302 having user input mechanism(s) 304 for access by a user 306. User 306 interacts with user input mechanisms 304 to control and manipulate plant evaluation system 226. For example, user 306 can control image analysis system 294, view images 308 stored in data store 292, to name a few. Also, user 306 can view the image analysis results and evaluate how to treat the field (or various portions within the field) based upon the results. Plant evaluation system 226 can also generate recommendations for treating various spots within the field, based upon the analysis data. This can vary widely from things such as applying more herbicide, applying fertilizer, to name a few. A control signal generator logic 310 is configured to generate control signals to control items of system 226, or other items in architecture 200.

Image analysis system 294 includes image receiving logic 312 configured to receive images from image capture system 224 and image pre-processing logic 314 configured to pre-process those images. For example, logic 314 includes a shadow corrector 316 configured to perform shadow correction on the images, illumination normalizer 318 configured to normalize illumination in the image, image combiner 320 configured to combine images, and can include other items 322 as well.

Image combiner 320, in one example, is configured to combine a number of images into a larger image of the field under analysis. For instance, image combiner 320 can mosaic the images and geo-reference them relative to ground control points. In order to mosaic the images, geographic location information corresponding to each of the images is used to stich them together into a larger image of the field under analysis, which is then analyzed by system 294. Further, the geo-referencing of images can be done automatically against the ground control points, or it can be done manually as well.

Geo-referencing logic 324 is configured to geo-reference the images, or combined images, to locations in the field, spatial analysis logic 326 is configured to perform spatial analysis on the images, and spectral analysis logic 328 is configured to perform spectral analysis on the images. Spatial analysis logic 326, in one example, obtains previously-generated crop location data which provides a geographic location of the rows of crop plants (or the plants themselves). For example, this can be generated during a planting operation using a planting machine. Of course, crop location data can be obtained from other sources as well. In any case, the crop location data can be utilized to identify the crop rows, and thus the areas between the crop rows that are expected to be free of crop plants. This can include identifying a reference line that corresponds to the center of each crop row along with a margin window around that reference line, for each row. As discussed in further detail below, plants identified between two adjacent reference lines (and/or margin window) can be assumed to be a non-crop plant (e.g., a weed plant).

Spectral analysis logic 328 performs spectral analysis to evaluate the plants in the images. In one example, this includes identifying areas in the image that have a spectral signature that corresponds to ground versus plants. For instance, this can include a green/brown comparison.

Image segmentation logic 330 is configured to perform image segmentation on a received image, to segment or divide the image into different portions for processing. This can be based on ground and/or plant area identifications by ground/plant identification logic 332, and crop classification performed by crop classification logic 334. This is discussed in further detail below. Briefly, however, ground/plant identification logic 332 identifies areas of an image that represent ground and areas of an image that represent plants, for example using the spatial and spectral analysis performed by logic 326 and 328, respectively.

Crop classification logic 334 uses a crop classifier, that can be trained by crop classifier training logic 336. In one example, the crop classifier is trained using crop training data 337 stored in data store 292, or obtained otherwise. The crop classifier is configured to identify areas in the image that represent crop plants.

Weed identification logic 338 is configured to identify weeds in the image, based on the image segmentation performed by image segmentation logic 330. This is discussed in further detail below. Briefly, however, image segmentation logic 330 is configured to identify a weed plant portion of a received image, that omits a first portion of the image that represents ground in the field and a second portion of the image that represents crop plants. This remaining portion of the image is determined to represent weeds. Illustratively, in one example, this process is performed without using a weed classifier or otherwise directly identifying weed plants in the image.

The location of the weeds can be stored as crop location data 339, weed data 340 in data store 292, which can store other items 342 as well.

Image analysis system 294 can also include anomaly detection logic 344 and can include other items 346 as well. Anomaly detection logic 344 is configured to detect anomalies based on the weed plant image (e.g., the portion of the image remaining after the ground image portion and the crop image portion have been omitted). Illustratively, a detected anomaly represents anomalous crop detections. For instance, one example of an anomaly is a crop plant detection in an area that is in between the crop rows. This can represent a false positive detection by the crop classifier, and can be used to re-train the crop classifier to improve its performance.

Figure 5:
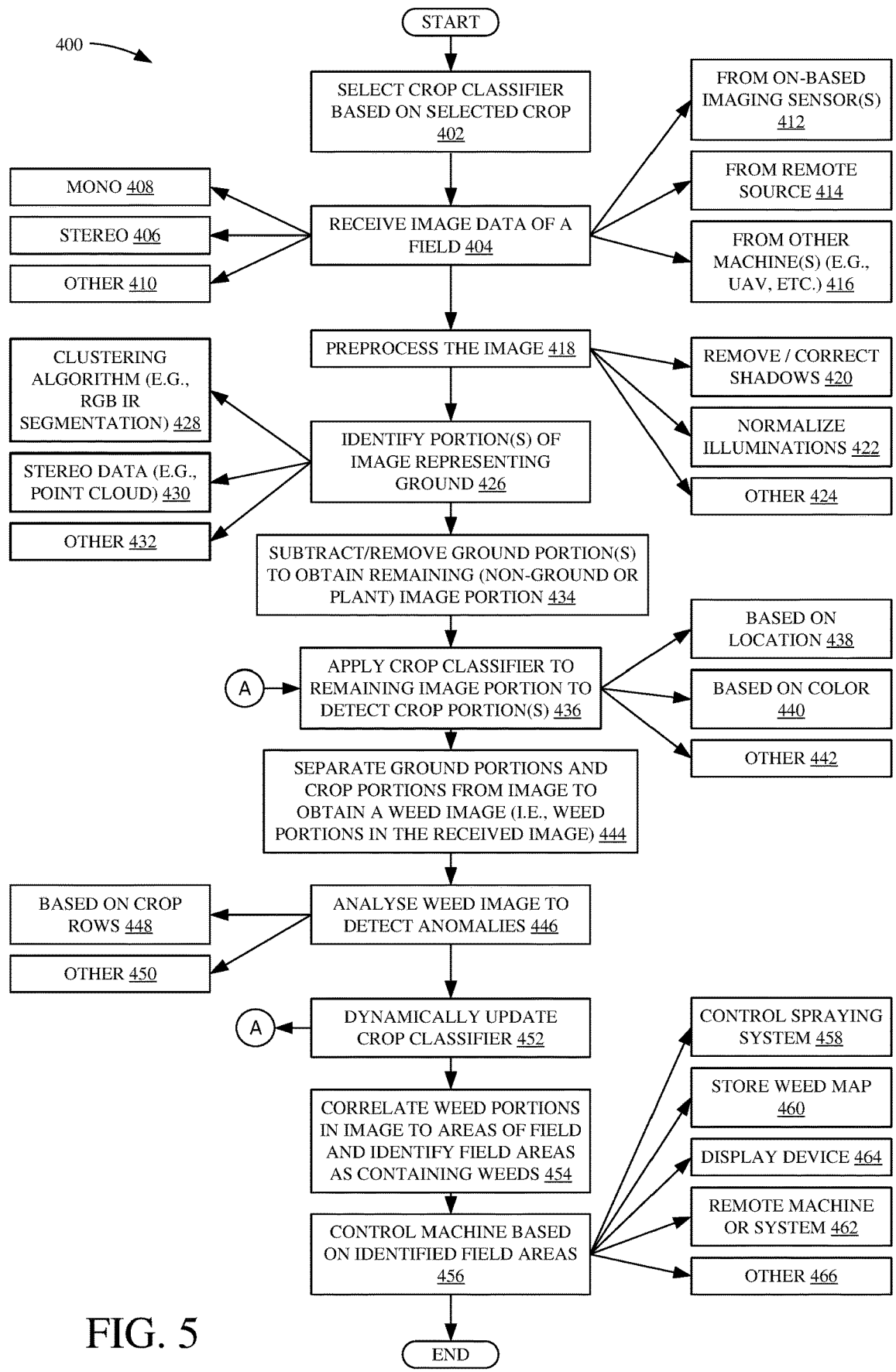
FIG. 5 is a flow diagram illustrating an example operation of a plant evaluation system to identify weed plants from image data.

FIG. 5 illustrates one example of a flow diagram 400 for identifying weed plants from image data and corresponding machine control. For sake of illustration, but not by limitation, FIG. 5 will be described in the context of plant evaluation system 226 in architecture 200.

At block 402, a crop classifier to be used by crop classification logic 334 is selected based on a selected crop. For example, the selected crop can be selected by operator 230. In one example, the crop classifier is a classifier that is trained by training logic 336 accessing crop training data 337 to classify portions of an image representing plants as being crop plants, as opposed to non-crop plants or weeds. The training data can take any of a variety of forms, such as images labeled with crop data identifying areas of the images that are crop plants and/or areas of the image that are non-crop plants. For example, to train a corn plant classifier configured to identify corn plants in a plant image, a set of training images are labeled with identifiers that identify the areas of the image that represent crop plants.

At block 404, image data indicative of an image of a field is received by image receiving logic 312. As noted above, the image can be obtained in any of a wide variety of ways. The image can comprise a single image obtained by a camera, an image within a time series of still images, or an image from a video. Further, the image can comprise a stereo image (represented by block 406), a mono image 408, or other type of image 410. Also, the image can be received from an on-board imaging sensor, such as from on-board image capture system 278. This is represented by block 412. Alternatively, or in addition, the image can be received from a remote source, such as from remote computing system 214. This is represented by block 414. Further yet, the image can be received from another machine 215. For instance, a UAV that flies over the field prior to a spraying operation acquires images of the field. This is represented by block 416.

At block 418, the image is pre-processed. This can include removing or correcting shadows using shadow corrector 316. This is represented by block 420. Also, the image can be processed to normalize illuminations using illumination normalizer 318. This is represented by block 422. Of course, the image can be pre-processed in other ways as well. This is represented by block 424.

At block 426, one or more portions of the image representing ground in the field are identified. This can be done in any of a number of ways. For example, this can be done based on colors identified in the image. For instance, image processing is performed using RGB (red-green-blue) color vectors. RGB color data refers to a color model in which red, green and blue light (or signals or data representative thereof) are combined to represent other colors. Each pixel or group of pixels of the collected image data may be associated with an image parameter level or a corresponding pixel value or aggregate pixel value. Thus, each pixel stands for one discrete location in the image and stores data for three channels (red, green, and blue) to represent a certain color. The image parameter level is an indicator of or a measure of an image parameter that observed, reflected and/or emitted from one or more objects in any other portion of one or more objects within the image. A clustering algorithm can be configured to cluster pixel values to generate a base color vector and/or averaged color vector for the image. Accordingly, at block 428, a clustering algorithm can be utilized with RGB IR segmentation to segment the image based on RGB color vectors.

Figure 6:
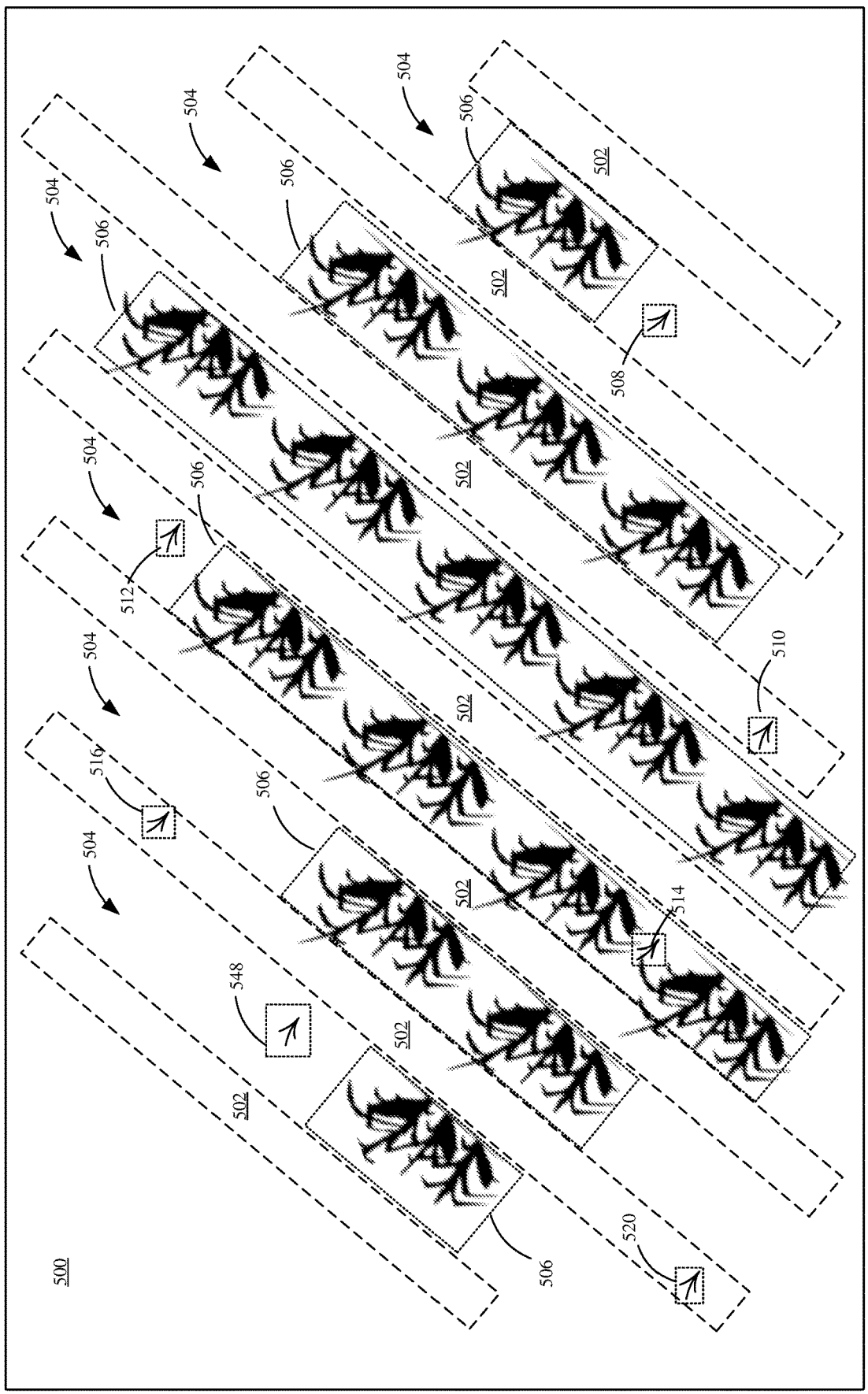
FIG. 6 illustrates an example image of a field.

Referring to FIG. 6, which illustrates an example image 500 of a portion of field, block 428 identifies portions 502 as areas of the image representing ground, determined based on differences in the color during color segmentation. Portions 502 are, in this example, identified as containing brown, or threshold shades of brown, and the other areas of the image are green or at least beyond a threshold difference from the brown color of portions 502. Thus, block 426 identifies portions 502 as representing the ground.

Alternatively, or in addition, the portions of the image representing ground can be identified using stereo data, such as a point cloud. This is represented by block 430 in FIG. 5. For example, as noted above, the stereo data can provide three-dimensional information to distinguish the location of the plant material relative to the ground plane. Thus, the stereo data at block 430 can be used to identify areas of the image representing material that is above the ground plane (e.g., above the ground by a threshold distance. Referring again to FIG. 6, block 430 identifies the areas of the image generally represented by reference numeral 504 as representing plants, and these portions of the image are separated from the ground portions 502. In one example, a remaining image portion is obtained that omits the ground portions 502.

The image portions representing the ground can be identified in other ways as well. This is represented by block 432 in FIG. 5. At block 434, the ground portion(s) identified at block 426 are separated to obtain a remaining (non-ground or plant) image portion that represents areas in the field that include plants (both crop and non-crop plants). The remaining image portion obtained at block 434 omits the ground portions. This can be done in any of a number of ways. For example, image segmentation logic 330 can segment or divide the image, and extract the non-ground portions, to obtain the remaining image portion. In one example, the received image, or a copy thereof, is stored in memory and the remaining image portion is obtained by removing the image data for the non-ground portions from the memory, so that only the image data for the remaining image portion remains. This, of course, is by way of example only.

At block 436, crop portions in the remaining image portion are detected. Illustratively, the detection is performed by applying a crop classifier to the remaining image portion. As noted above, crop classification logic 334 can apply a crop classifier by crop classifier training logic 336 using crop training data 337.

The detection of the crop portions at block 436 can be based on location within the image (block 438) and/or based on color within the image (block 440). Of course, the detection can be performed in other ways as well. This is represented by block 442.

In one example of block 438, logic 334 obtains crop location data 339. As discussed above, crop location data 339 can be obtained from a prior planting operation, or otherwise, and indicates the locations where crop seeds were planted, which can be indicative of the crop rows, the crop spacings within the rows, etc. Using crop location data 339, logic 334 can identify the locations within the image where a crop plant is expected. Also, using crop location data 339, logic 334 can determine that plants that appear in between the rows are likely to be non-crop plants.

In one example of block 440, logic 334 looks at the RGB color vectors from a pixel clustering algorithm to determine whether an area of the image that represents a plant indicates a crop plant or a non-crop plant.

At block 444, a weed (non-crop plant) image is obtained which represents weed portions in the received image. In the illustrated example, the weed image is obtained based on the identification of a first image portion (i.e., a ground portion identified at block 426) and a second image portion (i.e., a crop portion identified at block 436). That is, the weed image a remaining image portion that omits the ground portions and the crop portions in the image. This can be done by image segmentation logic 330 separating the weed image portion from the other portions, or otherwise.

For sake of illustration, with reference again to FIG. 6, block 436 detects image portion 506 as representing crop based on the location of that image portion relative to the rows and based on the color of that image portion relative to a portion 508 that represents a weed plant. Block 444 obtains a weed image that includes portions 508, 510, 512, 514, 516, 518, and 520, and omits the ground portions 502 and crop portions 506.

Referring again to FIG. 5, at block 446, the weed image is analyzed to detect anomalies. As noted above, anomalies can be detected for any of a number of reasons. In one example, an anomaly is detected based the location on the crop rows. This is represented by block 448. For example, if a crop portion is detected at block 436 and resides in between crop rows, identified based on location at block 438, then an anomaly is detected as the plant in that portion of the image is unlikely to be a crop plant. Anomalies can be detected in other ways as well. This is represented by block 450. At block 452, logic 338 dynamically updates or tunes the crop classifier based on the detected anomalies. The updated crop classifier can be re-applied by returning to block 436.

At block 454, the weed portions identified at block 444 are correlated to their respective areas of the field. These areas of the field are identified as containing weeds. In one example, weed identification logic 338 generates geographic coordinates for each separate field area that has been identified as containing weeds, and stores this data as weed data 340.

At block 456, control signal generator logic 310 generates a control signal based on the identified field areas. This control signal controls one or more systems or machines in architecture 200 in any of a variety of ways.

For example, control signal generator logic 310 can generate a control signal to control spraying subsystem 244 to apply a liquid chemical to the identified field areas. This is represented by block 458. In another example, the control signal generator logic 310 can control a weed map generator 345 to generate a weed map that identifies locations of the weeds on a map of the field.

Alternatively, or in addition, the control signal can control communication system 290 to send the weed data or weed map to a remote machine or system. This is represented by block 462. For instance, the weed data can be sent to another spraying machine, remote computing system 214, etc.

In one example, the control signal controls a display device, such as interfaces 228 and/or 302 for operator 230 or user 306. This is represented by block 464. Of course, the machine control signal can be generated to control other items in architecture 200. This is represented by block 466.

It can thus be seen that the present system provides a number of advantages. For example, but not by limitation, performing weed identification using a remaining image portion, remaining after omitting ground and crop portions, increases the speed and efficiency in the processing. Further, applying a crop classifier to identify crops from the plant portions of the image reduces the computational burden and expensive. Further, actions can be taken based upon the weed identification to save chemicals, to save time, and to otherwise improve the agricultural operations.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
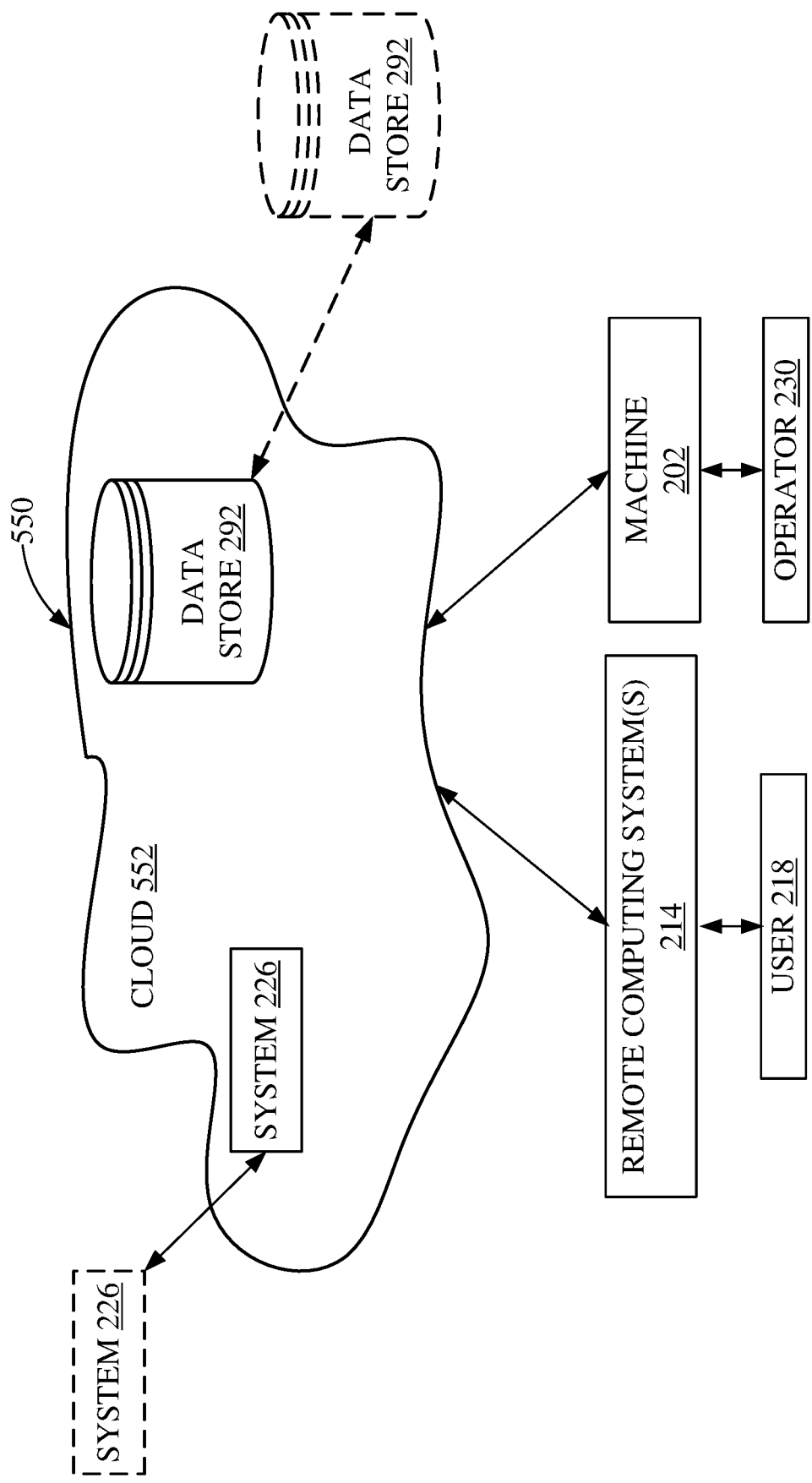
FIG. 7 is a block diagram showing one example of the architecture illustrated in FIG. 3, deployed in a remote server architecture.

FIG. 7 is a block diagram of one example of the architecture shown in FIG. 3, where machine 202 communicates with elements in a remote server architecture 550. In an example, remote server architecture 550 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 3 and they are similarly numbered. FIG. 7 specifically shows that system 226 and data store 292 can be located at a remote server location 552. Therefore, agricultural machine 202 accesses those systems through remote server location 552.

FIG. 7 also depicts another example of a remote server architecture. FIG. 7 shows that it is also contemplated that some elements of FIG. 3 are disposed at remote server location 552 while others are not. By way of example, data store 292 can be disposed at a location separate from location 552, and accessed through the remote server at location 552. Alternatively, or in addition, system 226 can be disposed at location(s) separate from location 552, and accessed through the remote server at location 552.

Regardless of where they are located, they can be accessed directly by agricultural machine 202, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
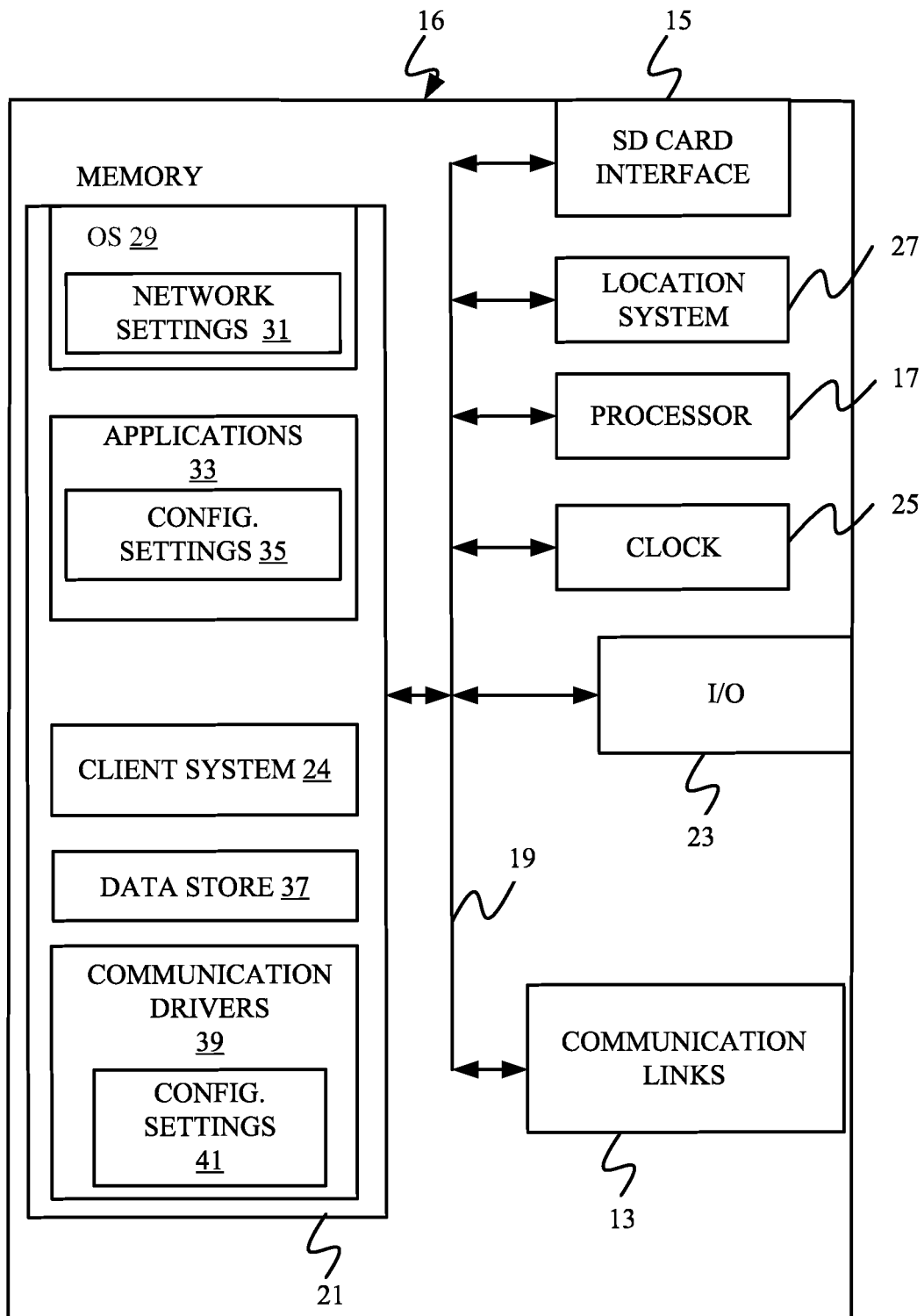
FIGS. 8-10 show examples of mobile devices that can be used in the architectures shown in the previous figures.
Figure 9:
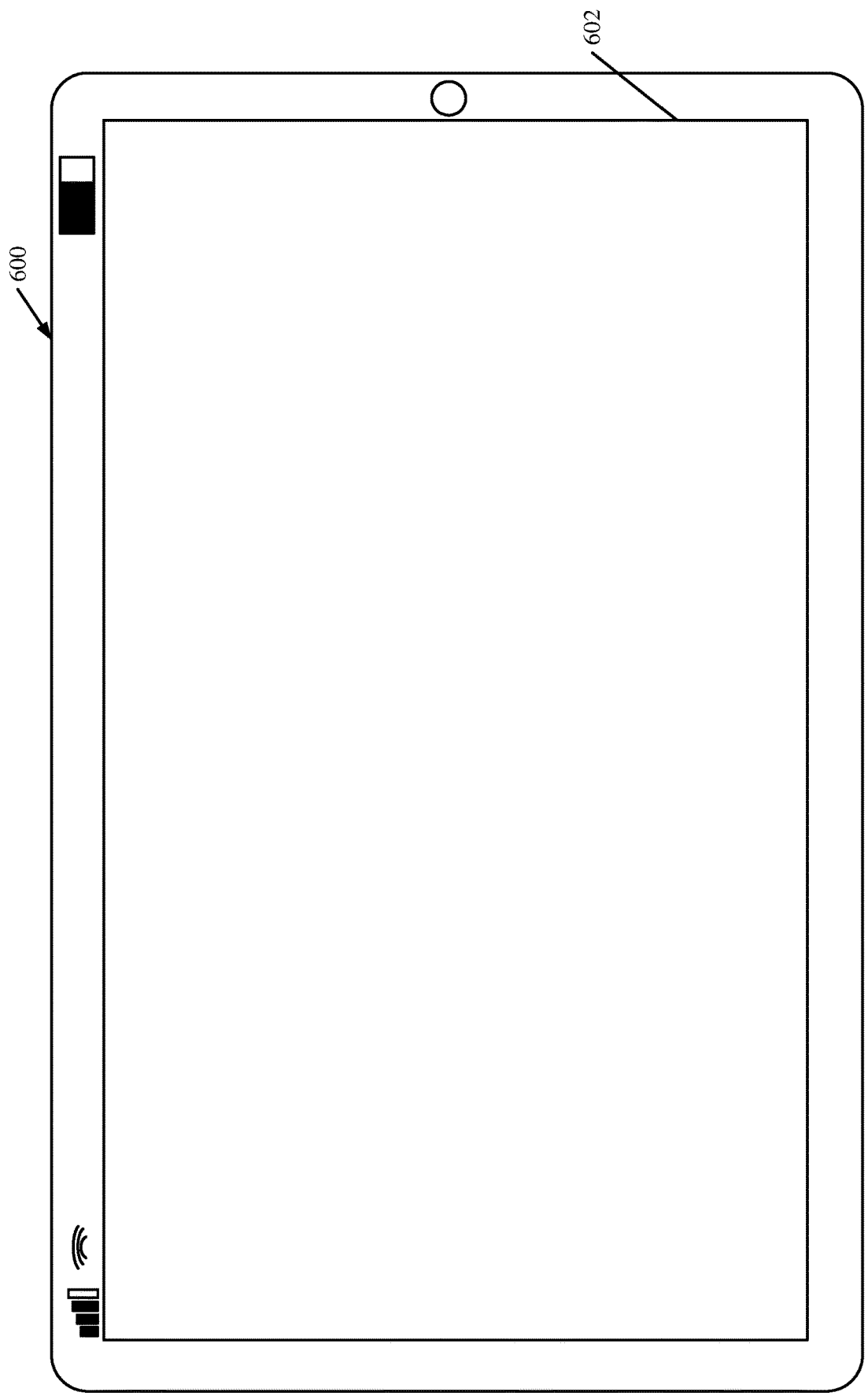
Figure 10:
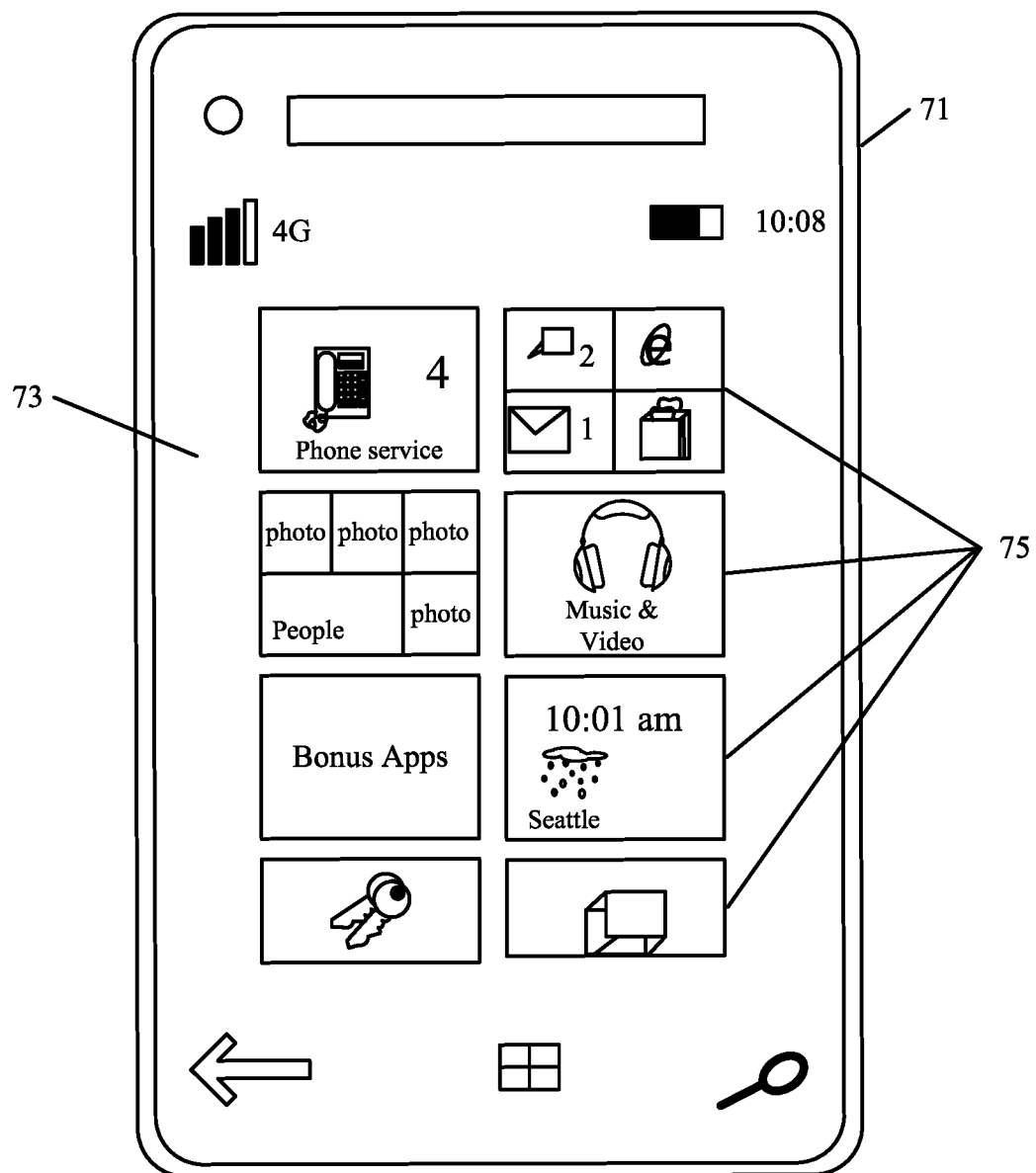

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural machine 202 (or 204) or as remote computing system 214. FIGS. 9-10 are examples of handheld or mobile devices.

FIG. 8 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
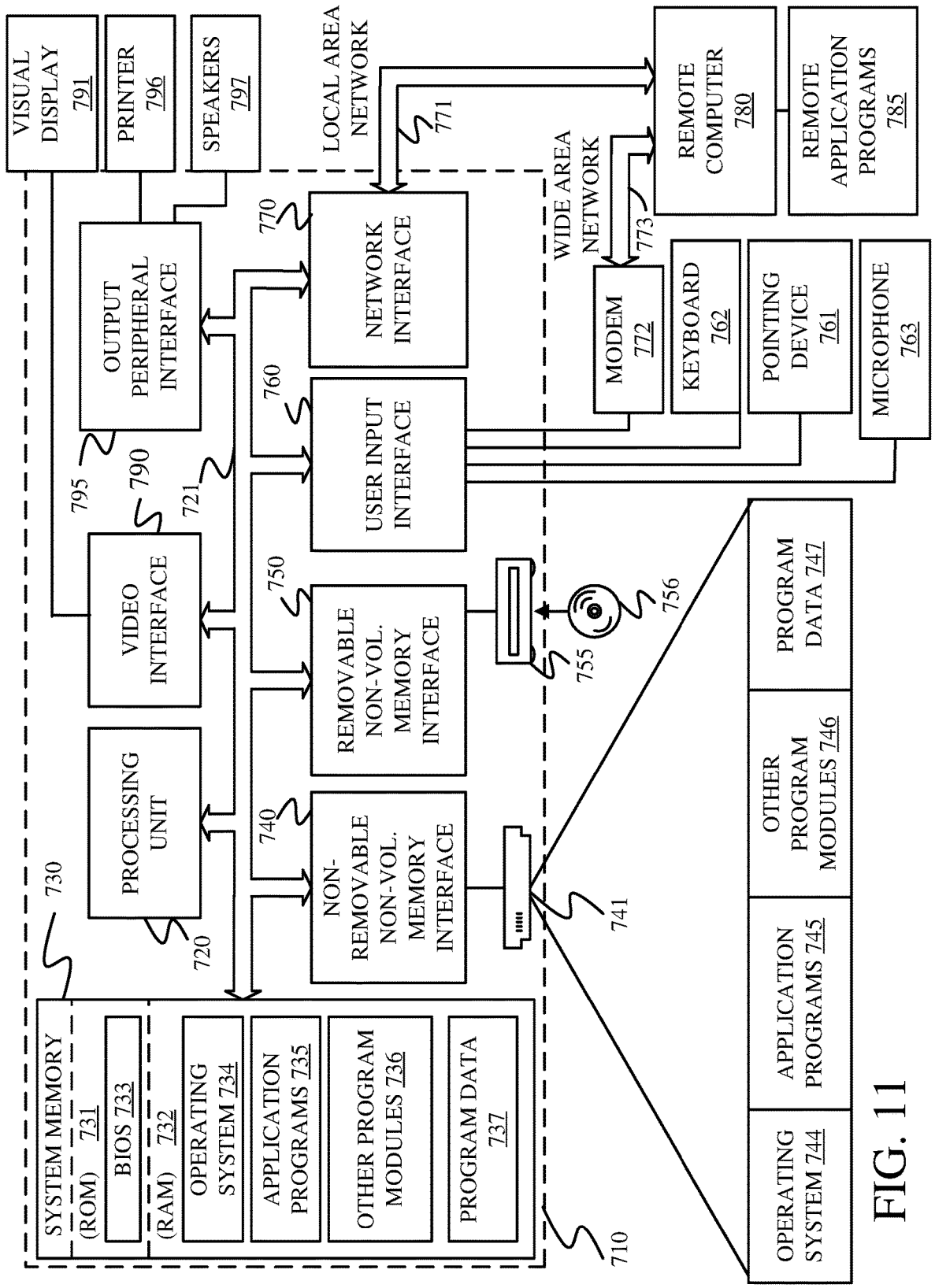
FIG. 11 is a block diagram showing one example of a computing environment that can be used in the architectures shown in the previous figures.

FIG. 11 is one example of a computing environment in which elements of FIG. 3, or parts of it, (for example) can be deployed. With reference to FIG. 11, an example system for implementing some embodiments includes a computing device in the form of a computer 710. Components of computer 710 may include, but are not limited to, a processing unit 720 (which can comprise processors or servers from previous FIGS.), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. Memory and programs described with respect to FIG. 3 can be deployed in corresponding portions of FIG. 11.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 11 illustrates operating system 734, application programs 735, other program modules 736, and program data 737.

The computer 710 may also include other removable/non-removable volatile/nonvolatile computer storage media. By way of example only, FIG. 11 illustrates a hard disk drive 741 that reads from or writes to non-removable, nonvolatile magnetic media, an optical disk drive 755, and nonvolatile optical disk 756. The hard disk drive 741 is typically connected to the system bus 721 through a non-removable memory interface such as interface 740, and optical disk drive 755 is typically connected to the system bus 721 by a removable memory interface, such as interface 750.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 710. In FIG. 11, for example, hard disk drive 741 is illustrated as storing operating system 744, application programs 745, other program modules 746, and program data 747. Note that these components can either be the same as or different from operating system 734, application programs 735, other program modules 736, and program data 737.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures. A visual display 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections (such as a local area network—LAN, or wide area network—WAN or a controller area network—CAN) to one or more remote computers, such as a remote computer 780.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. In a networked environment, program modules may be stored in a remote memory storage device. FIG. 11 illustrates, for example, that remote application programs 785 can reside on remote computer 780.

It should also be noted that the different examples described herein can be combined in different ways. That is, parts of one or more examples can be combined with parts of one or more other examples. All of this is contemplated herein.

Example 1 is a computing system comprising:
image receiving logic configured to receive image data indicative of an image of a field;
ground identification logic configured to identify a first image portion of the image representing ground in the field;
image segmentation logic configured to identify a remaining image portion that omits the first image portion from the image;
crop classification logic configured to:
apply a crop classifier to the remaining image portion; and
identify a second image portion of the image that represents locations of crop plants in the field;
weed identification logic configured to identify locations of weed plants in the field based on the identification of the first and second image portions; and
control signal generation logic configured to generate a machine control signal based on the identified locations of the weed plants.

Example 2 is the computing system of any or all previous examples, wherein the image segmentation logic is configured to obtain a third image portion that omits the first and second image portions from the image.

Example 3 is the computing system of any or all previous examples, wherein the weed identification logic is configured to identify the location of the weeds based on the third image portion.

Example 4 is the computing system of any or all previous examples, wherein the second image portion is identified based on spatial analysis.

Example 5 is the computing system r of any or all previous examples, wherein the spatial analysis uses crop location data indicative of a geographic location of crops in the field.

Example 6 is the computing system of any or all previous examples, wherein the second image portion is identified based on spectral analysis.

Example 7 is the computing system of any or all previous examples, wherein the spectral analysis uses a clustering algorithm with RGB segmentation.

Example 8 is the computing system of any or all previous examples, and further comprising crop classifier training logic configured to receive training data and to training the crop classifier to identify the crop based on the training data.

Example 9 is the computing system of any or all previous examples, wherein the training data comprises images labeled with crop data.

Example 10 is the computing system of any or all previous examples, and further comprising anomaly detection logic configured to detect an anomaly based on application of the crop classifier.

Example 11 is the computing system of any or all previous examples, wherein the crop classifier training logic is configured to train the crop classifier based on the detected anomaly.

Example 12 is the computing system of any or all previous examples, wherein the anomaly is detected based on crop location data indicative of a geographic location of crops in the field.

Example 13 is a method performed by a computing system, the method comprising:
receiving image data indicative of an image of a field;
identifying a first image portion of the image representing ground in the field;
identifying a remaining image portion that omits the first image portion from the image;
identifying, based on applying a crop classifier to the remaining image portion, a second image portion of the image that represents locations of crop plants in the field;
identifying locations of weed plants in the field based on the identification of the first and second image portions; and
generating a machine control signal based on the identified locations of the weed plants.

Example 14 is the method of any or all previous examples, and further comprising identifying a third image portion that omits the first and second image portions from the image.

Example 15 is the method of any or all previous examples, and further comprising:
identifying the location of the weeds based on the third image portion.

Example 16 is the method of any or all previous examples, wherein identifying the second image portion comprises performing spatial analysis on the image.

Example 17 is the method of any or all previous examples, wherein the spatial analysis uses crop location data indicative of a geographic location of crops in the field.

Example 18 is the method of any or all previous examples, wherein identifying the second image portion comprises performing spectral analysis on the image.

Example 19 is a control system for an agricultural spraying machine, the control system comprising:
a plant evaluation system configured to:
receive image data indicative of an image of a field;
identify a first image portion of the image representing ground in the field;
define a remaining image portion that omits the first image portion from the image;
identify, in the remaining image portion, a second image portion of the image that represents locations of crop plants in the field;
define a weed image that omits the first and second image portions from the image; and
identify locations of weeds in the field based on the weed image; and
a control signal generator configured to generate a machine control signal based on the identified locations of the weed plants.

Example 20 is the control system of any or all previous examples, wherein the plant evaluation system is configured to:
identify the second image portion based on at least one of spatial analysis or spectral analysis on the image; and
apply a crop classifier to the second image portion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for an agricultural machine, the control system comprising:
at least one processor; and
memory storing instructions executable by the at least one processor, wherein the instructions, when executed, cause the control system to:
receive image data representing an image of a field;
identify a first image portion of the image representing ground in the field;
define a remaining image portion of the image that omits the first image portion;
apply a crop classifier to the remaining image portion, the crop classifier configured to identify a target crop type;
generate, based on application of the crop classifier, anomaly data representing a characteristic of a crop plant detected in the remaining image portion; and
generate a control signal that controls the agricultural machine based on the anomaly data.

2. The control system of claim 1, wherein the instructions cause the control system to:
apply the crop classifier to the remaining image portion to identify, in the remaining image portion, a second image portion of the image that represents locations of crop plants in the field; and
generate the anomaly data representing an anomaly of the crop plant detected in the second image portion.

3. The control system of claim 2, wherein the instructions cause the control system to:
detect the anomaly of the crop plant, in the second image portion, based on at least one of spatial analysis or spectral analysis.

4. The control system of claim 3, wherein the instructions cause the control system to:

determine that the detection of the crop plant comprises a false positive detection by the crop classifier.

5. The control system of claim 4, wherein the instructions cause the control system to:
train the crop classifier based on the false positive detection.

6. The control system of claim 4, wherein the instructions cause the control system to:
identify the false positive detection based on prior crop location data identifying locations of crop rows on the field.

7. The control system of claim 6, wherein the instructions cause the control system to:
identify a first crop row;
identify a second crop row;
determine that the crop plant is located in an area between the first crop row and the second crop row; and
identify the false positive detection based on the determination.

8. The control system of claim 1, wherein the instructions cause the control system to:
detect an anomaly of a crop plant, in the second image portion, based on application of the crop classifier;
define a weed image that omits the first and second image portions from the image and is based on the detected anomaly;
identify locations of weeds in the field based on the weed image; and
generate the control signal based on the identified locations of the weed plants.

9. The control system of claim 1, wherein the crop classifier is trained with labeled training data representing the crop type.

10. A computer-implemented method comprising:
receiving image data representing an image of a field;
identifying a first image portion of the image representing ground in the field;
defining a remaining image portion of the image that omits the first image portion;
applying a crop classifier to the remaining image portion, the crop classifier configured to identify a target crop type;
generating, based on application of the crop classifier, anomaly data representing a plant characteristic in the remaining image portion; and
generating a control signal that controls the agricultural machine based on the anomaly data.

11. The computer-implemented method of claim 10, and further comprising:
applying the crop classifier to the remaining image portion to identify, in the remaining image portion, a second image portion of the image that represents locations of crop plants in the field; and
generating the anomaly data representing an anomaly of the crop plant detected in the second image portion.

12. The computer-implemented method of claim 11, and further comprising:
detecting the anomaly of the crop plant, in the second image portion, based on at least one of spatial analysis or spectral analysis.

13. The computer-implemented method of claim 12, and further comprising:
determining that the detection of the crop plant comprises a false positive detection by the crop classifier.

14. The computer-implemented method of claim 13, and further comprising:

training the crop classifier based on the false positive detection.

15. The computer-implemented method of claim 13, and further comprising:
identifying the false positive detection based on prior crop location data identifying locations of crop rows on the field.

16. The computer-implemented method of claim 15, and further comprising:
identifying a first crop row;
identifying a second crop row;
determining that the crop plant is located in an area between the first crop row and the second crop row; and
identifying the false positive detection based on the determination.

17. The computer-implemented method of claim 10, and further comprising:
detecting an anomaly of a crop plant, in the second image portion, based on application of the crop classifier;
defining a weed image that omits the first and second image portions from the image and is based on the detected anomaly;
identifying locations of weeds in the field based on the weed image; and
generating the control signal based on the identified locations of the weed plants.

18. An agricultural machine comprising:
an image capture device configured to capture an image of a field; and
a control system configured to:
receive image data representing an image of a field;
identify a first image portion of the image representing ground in the field;
define a remaining image portion of the image that omits the first image portion;
apply a crop classifier to the remaining image portion, the crop classifier configured to identify a target crop type;
generate, based on application of the crop classifier, anomaly data representing a characteristic of a crop plant detected in the remaining image portion; and
generate a control signal that controls the agricultural machine based on the anomaly data.

19. The agricultural machine of claim 18, wherein the control system is configured to:
apply the crop classifier to the remaining image portion to identify, in the remaining image portion, a second image portion of the image that represents locations of crop plants in the field; and
generate the anomaly data representing an anomaly of the crop plant detected in the second image portion.

20. The agricultural machine of claim 18, wherein the control system is configured to:
detect the anomaly of the crop plant, in the second image portion, based on at least one of spatial analysis or spectral analysis.

* * * * *